United States Patent [19]
Guenther

[11] Patent Number: 6,111,951
[45] Date of Patent: Aug. 29, 2000

[54] POSTAGE METER MACHINE WITH A CHIP CARD WRITE/READ UNIT AND METHOD FOR OPERATING SAME

[75] Inventor: Stephan Guenther, Berlin, Germany

[73] Assignee: Francotyp-Postalia AG & Co., Birkenwerder, Germany

[21] Appl. No.: 09/211,192

[22] Filed: Dec. 15, 1998

[30] Foreign Application Priority Data

Dec. 15, 1997 [DE] Germany .......................... 197 57 651

[51] Int. Cl.[7] .................................................. H04K 1/00
[52] U.S. Cl. ................................ 380/23; 380/51; 705/60; 235/375
[58] Field of Search .......................... 380/23, 51; 705/60; 235/375

[56] References Cited

U.S. PATENT DOCUMENTS

| | | |
|---|---|---|
| 4,746,234 | 5/1988 | Harry . |
| 4,802,218 | 1/1989 | Wright et al. .............................. 380/23 |
| 4,864,618 | 9/1989 | Wright et al. .............................. 380/51 |
| 5,490,077 | 2/1996 | Freytag . |

FOREIGN PATENT DOCUMENTS

| | | |
|---|---|---|
| 195 16 429 | 11/1996 | Germany . |
| 196 05 015 | 3/1997 | Germany . |

*Primary Examiner*—Harold I. Pitts
*Attorney, Agent, or Firm*—Hill & Simpson

[57] ABSTRACT

A postage meter machine has a chip card write/read unit and a controller which, in conjunction with suitably initialized chip cards, allows the function input and the administration of cost center data to be handled in a simplified manner. For deriving chip cards that set a limited function scope, a table with a specific hierarchic structure can be produced using the keyboard and display and with the assistance of the microprocessor and the appertaining non-volatile memories within the postage meter machine, so that the pre-stored structure is correspondingly modified by the user. A tree structure in the hierarchy thereby arises for second chip cards and further successor cards derived from the first chip card, particularly specific function application cards that allow access to the table with their chip card number internally stored in the chip card. The allocation of a chip card number to function applications with limit data can be arbitrarily selectably stored in non-volatile memory areas A, B, C by the authorized user.

10 Claims, 5 Drawing Sheets

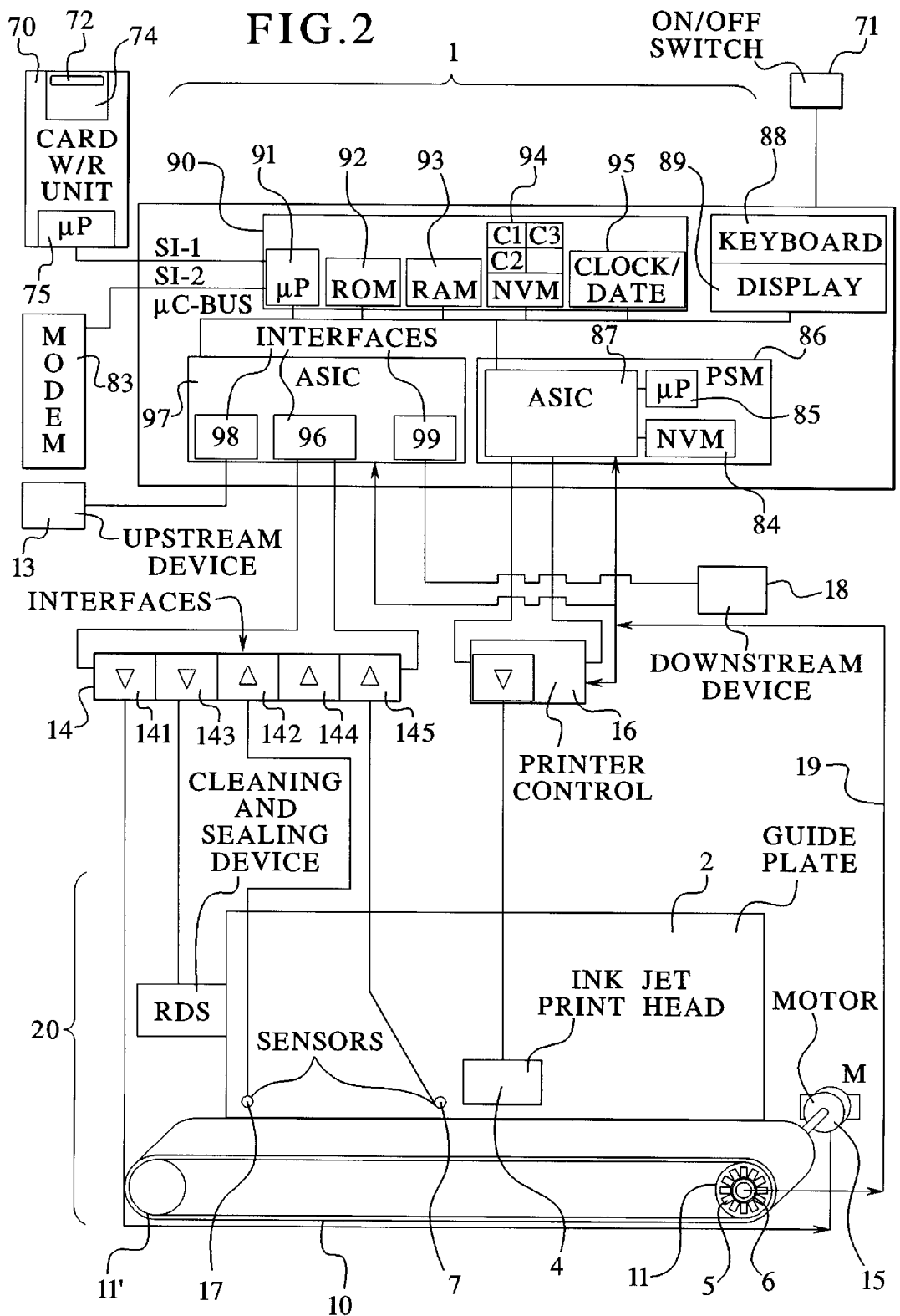

POSTAGE METER MACHINE WITH A CHIP CARD WRITE/READ UNIT AND METHOD FOR OPERATING SAME

BACKGROUND OF THE INVENTION

1. Field of the Invention

The present invention is directed to a postage meter machine with a chip card write/read unit, of the type wherein a microprocessor controls a printing procedure dependent on a chip card which is currently inserted in the write/read unit. The present invention is also directed to a method for operating such a postage meter machine.

2. Description of the Prior Art

It is known to keep track of accounting-specific data about cost centers in postage meter machines. The purpose of the cost center concept is to introduce transparency into the accounting of devices that are used by different users. The term "cost center" means a non-volatile memory area provided for department-by-department accounting or booking of usage activity. Each cost center has a number and/or name allocated to it via which the aforementioned memory area is selected. The business entity associated with a cost center is ultimately responsible for the cost (charge) for postage or shipping fees incurred by personnel who use the postage meter machine who are employed by the business entity.

Modern postage meter machines such as, for example, the thermal transfer postage meter machine disclosed by U.S. Pat. No. 4,746,234 utilize fully electronic digital printer devices. It is thus fundamentally possible to print arbitrary texts and special characters in the postage stamp printing area and to print an arbitrary advertizing slogan or one allocated to a cost center. For example, the postage meter machine T1000 of Francotyp-Postalia AG & Co. (Postalia, Inc. in the United States) has a microprocessor that is surrounded by a secured housing having an opening for the delivery of a letter. Given delivery of a letter, a mechanical letter sensor (microswitch) communicates a print request signal to the microprocessor. The franking imprint contains a previously entered and stored postal information for dispatching the letter.

It is also known to store data specific to cost centers on chip cards in order to make the user-specific information mobile (portable) and to avoid an intentional misuse of other cost centers. U.S. Pat. No. 5,490,077 discloses a data entry with chip cards for the aforementioned thermal transfer postage meter machine. One of the chip cards loads new data into the postage meter machine, and a set of further chip cards allows a setting of correspondingly stored data to be undertaken by plugging in a chip card. Loading data and setting the postage meter machine are thus possible in an easier and faster manner than via a keyboard input. The keyboard of the postage meter machine remains small and surveyable because no additional keys are required in order to load or set additional functions. A plug-in slot of a chip card write/read unit, in which the respective chip card is to be plugged by the customer within a time window, is located on the back side of the postage meter machine. Due to the lack of direct visual contact, an unpracticed user often does not always succeed in inserting the required chip cards in immediate succession, which then leads to unwanted delays. The plug-in slot of a chip card write/read unit is only easily accessible when the user bends over the machine. The problems in producing visual contact increase given larger machines. The user often has a number of other chip cards that can be plugged in. One chip card type (size format), for example telephone cards, credit cards and the like, can be physically inserted into the postage meter machine but will not be accepted. Without visual contact, however, the error is not always immediately obvious. The postage meter machine only works with relatively expensive chip cards that are themselves equipped with a microprocessor (smart card) and are thus able to check whether the postage meter machine communicates a valid data word to the chip card before an answer is sent to the postage meter machine. When, however, no answer or user identification ensues, this is registered as an error in the postage meter machine and is displayed before a request to remove the chip card is displayed in the display. To register an erroneously inserted telephone card as attempted fraud, however, would not be reasonable given the not unlikely occurrence of an "innocent" mistake.

German OS 196 05 015 discloses an embodiment for a printer device (JetMail®) that, given a non-horizontal, approximately vertical letter transport, implements a franking imprint with an ink jet print head stationarily arranged in a recess behind a guide plate. For recognizing the start (leading edge) of a letter, a print sensor is arranged shortly before the recess for the ink jet print head and collaborates with an incremental sensor. The letter transport is free of slippage due to pressure elements arranged on the conveyor belt, and the incremental sensor signal derived during the transport has a positive influence on the quality of the print image. Given such a postage meter machine exhibiting larger dimensions, however, a chip card write/read unit would have to be arranged and operated such that sequentially pluggable chip cards can be unproblematically used.

As an alternate way for solving the further problem that there is only limited memory capacity available on a chip card, U.S. Pat. No. 4,802,218 discloses that a number of chip cards be simultaneously employed, these being plugged into a number of write/read units. In addition to a user chip card for the recrediting and debiting. whereby the postage fee value is subtracted from the credit, a master card and a further rate chip card with a stored postage fee table are simultaneously plugged in. By accessing a postage fee table, a postage fee value can be determined according to the input weight and shipping destination without loading an entire table into the machine. Since, however, a respective write/read unit is required for every chip card, the apparatus becomes too large and expensive. Moreover, a separate reloading terminal is required in order to replenish the credit in the user chip card, with the master card providing the authorization for this reloading function. A supervisor card has access to all master cards. Various security levels are accessible by appertaining key codes. Such a system with a number of slots for chip cards is very complex overall.

German OS 195 16 429 discloses a method for an access authorization to a secured machine or circuit with card-like master elements that make card-like authorization elements perceptible as valid. Such card-like authorization elements that have been validated later allow access to the secured machine or circuit without the user having the master element in his or her possession. Further authorization elements also can be confirmed as valid. The authorization procedure includes an information exchange between a higher-ranking master element and a lower-ranking authorization element or master element, and an electronic lock of the secured machine or circuit. Specific customer wishes, however, can not be taken into consideration because all cards generated in this way are technologically and functionally identical and merely serve the purpose of distributing access authorizations of a hierarchically ordered administration of the secured machine or circuit.

The employment of a chip card for access authorization in different hierarchy levels as well is known. It is likewise known to require a PIN or password input in various security levels for insuring the authenticity of a user. It is disadvantageous, however, that there is no security procedure that can recognize a group of security requests which are individually adapted.

The chip cards are usually initialized by the chip card manufacturer and the postage meter machine manufacturer. It is somewhat complicated, however, for the postage meter machine manufacturer to take specific customer wishes into consideration. There is the necessity for the user of the postage meter machine to inform the manufacturer of his customer wishes that relate to a specific input function by chip card. Until the user has been sent an correspondingly initialized chip card, the postage meter machine can continue to be set for the specific input function only via the postage meter machine keyboard.

Inexpensive chip cards often only have high limited memory capacity. This memory capacity is neither sufficient for accepting the full scope of cost center-specific data nor for storing additional security data.

SUMMARY OF THE INVENTION

An object of the present invention is to provide a postage meter machine which allows different security measures in different security levels in order to achieve an adapted security protection. A further object is to provide such a machine which allows a user to program a security protection individually adapted according to a hierarchical principle into the postage meter machine.

This object is achieved in a postage meter machine wherein a master chip card authorizes the internal postage meter machine initialization of a successor chip card, causing a number to be written into the chip card memory of the successor card. As a result of the aforementioned initialization at least one application function is allocated to the chip card number for each successor card, and the allocation is stored in the non-volatile memory of the postage meter machine. The entire cost center handling within the postage meter machine is inventively controlled with the assistance of a consecutive number in every chip card that is employed in combination with the postage meter machine. A first application that allocates specific privileges (hierarchies), security measures and cost center numbers to specific chip card numbers is stored within the program memory of the postage meter machine. The first chip card supplied together with the postage meter machine is referred to as the master card. The authorization is not limited for this card. In addition to the consecutive number, however, the master card also contains boundary data or limit data limiting the application authorization of successor cards that effect the limitation of an operation when this is not set and triggered by the master card. These boundary or limit data supply an application-adapted security for a second chip card or for the further successor cards. The hierarchically highest-ranking, first chip card causes a limit account to be stored in a protected memory area of a non-volatile memory of the postage meter machine for the lower-ranking, second card. This principle is continued downward in the hierarchy for successor cards. The hierarchically higher-ranking, second chip card that causes a limit account to be stored in a protected memory area of the non-volatile memory of the postage meter machine for a lower-ranking successor card.

For deriving individual-adapted chip cards that enable a limited function scope and offer an individually adapted security, a table with a specific hierarchic structure is produced using the keyboard and display and with the assistance of the microprocessor and the appertaining non-volatile memory within the postage meter machine allowing the pre-stored structure to be modified. A tree structure thereby arises in the hierarchy for the second chip card derived from the inventive first chip card and for further successor cards, particularly specific function application cards. The aforementioned table is at least partially displayed according to the modified structure before a storage ensues. A limit account prescribed by the master card can only be modified in one direction, i.e. can only be more greatly limited. The aforementioned limit thus cannot be canceled. A set of chip cards that control the access to preselectable postage meter machine functions for the combined application thereof is made available to the user. Moreover, an easily accessible chip card write/read unit is arranged behind the guide plate, and an appertaining controller that avoids problems, upon plug-in or mistakes in the selection of a chip card is provided in the postage meter machine. The chip card/postage meter machine system can be arbitrarily expanded or user-modified. A different inserted chip card type can be recognized by the postage meter machine and correspondingly interpreted. The postage meter machine can be operated with an optimally inexpensive chip card type. The advantages of an unambiguous simple and fraud-resistant cost center selection by chip card thus are achieved while avoiding the use of substantial memory capacity. In addition to enabling the cost center, an enabling of predetermined, further functions can be achieved merely by plugging a chip card into a chip card write/read unit.

The table with a specific hierarchic and modifiable structure, in which limit data are stored in an allocated manner, is stored in corresponding memory areas of the non-volatile memory of the postage meter machine. The aforementioned, modifiable structure is divided into a list of valid card numbers, linkage conditions and appertaining parameter sets.

Every second and following chip card contains only a chip card number. The postage meter machine reserves a memory location for a parameter value for at least one type of limit value. This allows an inexpensive set of chip cards to be used, that are only partially pre-initialized at the manufacturer side. The desired chip card number additionally can be stored or modified in a third part of an identifier string in the memory areas of the chip card by an authorized user with the chip card write/read unit of the postage meter machine. A control device of the postage meter machine connected to the chip card write/read unit has the aforementioned non-volatile memory with memory areas for an allocation of listed application functions to limit data and to a chip card. The microprocessor of the control device of the postage meter machine is programmed to load the chip card number stored in the respective chip card, to call the application functions allocated in the list to the respective chip card number and stored in one of the memory areas of the non-volatile memory of the postage meter machine, and to implement the corresponding application program or programs stored in the program memory while adhering to the limit value. The allocation in the aforementioned memory areas can be arbitrarily selected by the authorized user and stored in the aforementioned memory areas within the cope of the limit values.

The divided, modifiable structure can be restored by the use of electronic pointers in order to undertake a corresponding data entry into the main memory, with the microprocessor of the postage meter machine implementing a corresponding function or a stored sequence of functions according to the application program. One of the functions can be implemented in order to at least partially display the structure in a table or in order to be able to modify the structure.

DESCRIPTION OF THE DRAWINGS

FIG. 2 is a block circuit diagram for setting the functions in a postage meter machine constructed and operating in accordance with the invention.

DESCRIPTION OF THE PREFERRED EMBODIMENTS

Chip cards are divided into types such as mere memory cards, intelligent memory cards ("smart" cards), processor chip cards and multi-functional chip cards. The application possibilities are maximized only for the latter type of card, but this is at the expense of a higher chip price.

Mere memory cards have a contact field with I/O interface circuit, address counter and decoder together with a non-volatile write/read memory EEPROM integrated on the common chip.

Intelligent memory cards (FIG. 1a) represent an optimization in view of price and application possibilities.

Figure 1A:
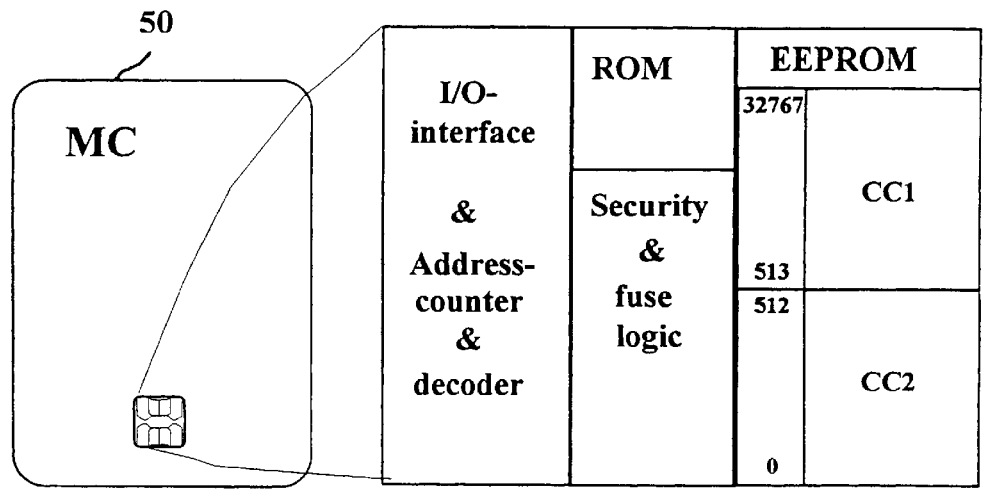
FIG. 1a schematically illustrates the layout of the memory areas of a chip card used in accordance with the invention.

FIG. 1a shows an arrangement of the memory areas and further components of the circuit in the chip of an intelligent chip card ("smart" card). As is known, the memories are located under the contact field of the chip card, the memory areas thereof being divided into unprotected and protected areas. Other data generated by the postage meter machine and chip card manufacturer are stored in both areas. Together with the non-volatile write/read memory EEPROM, the unprotected memory area CC1 and protected memory area CC2, a read-only memory ROM for a general memory area is also integrated on the common chip.

An additional security and protection logic, that implements a PIN check before security-relevant data in the protected memory area CC2 are accessed, is realized in the chip with a specific hardware. A chip card number in the identifier string is partially stored in the ROM and/or in the protected memory area CC2 as well as in the unprotected memory area CC1. The part of the chip card number in the unprotected memory area CC1 can be modified with the assistance of a higher authority. Security-relevant data that represent limit data in terms of time, piece count or value or contain functions that effect a limitation of an operation are stored in the protected memory area CC2 of a first chip card together with the one part of the chip card number.

The authorization of successor cards with a first chip card (master card) thus, for example, thus can be valid with a time limitation when corresponding, stored security-relevant data are loaded into a postage meter machine and are non-volatilely stored there as condition for an authorized successor card.

The protected area has been generated in various ways. A first part of the identifier string can only be written by the chip manufacturer in the read-only memory ROM. A second part of the identifier string can only be written by the postage meter machine manufacturer in the protected non-volatile EEPROM area. A protected data area in the third part of the identifier string is provided for the customer. This part is written by the postage meter machine manufacturer for master cards. The third part of the identifier string can be modified by the customer given further cards and successor cards. The user accesses this area according to a predetermined, preferably menu-controlled input via the postage meter machine keyboard. The aforementioned access is only possible for the authorized user. The latter, for example, has a chip card that has a higher rank in the hierarchy than the chip card to be initialized.

Figure 1B:
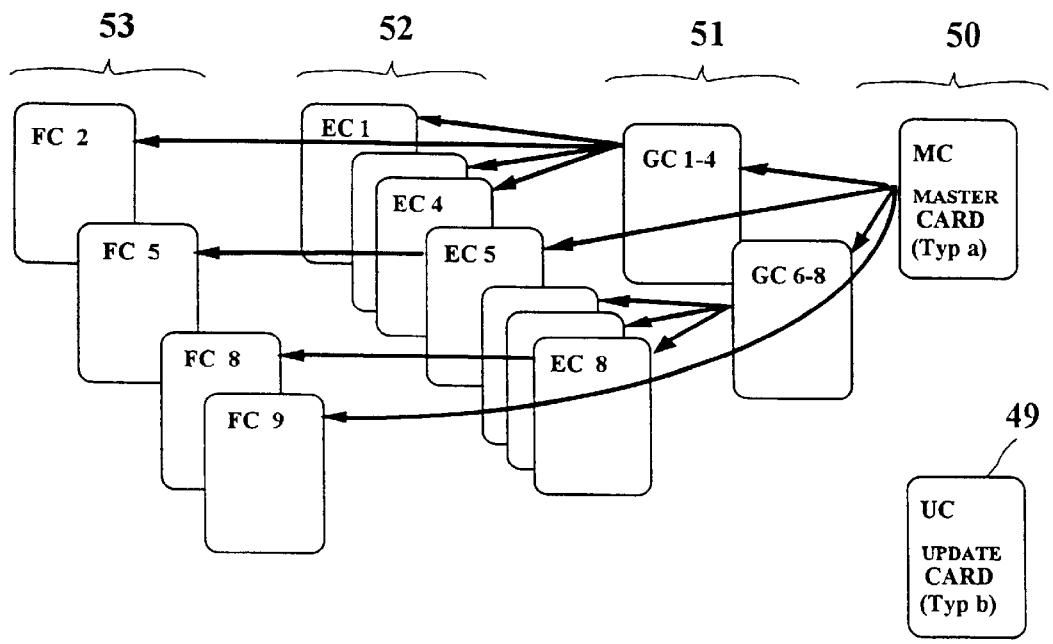
FIG. 1b illustrates the tree structure of the hierarchy for the function application cards derived from the master chip card in accordance with the invention.

A hierarchic structure that—as shown in FIG. 1b—can be arbitrarily expanded and modified by the postage meter machine user proceeding from a first chip card, is produced for a group of chip cards by the internal postage meter machine initialization with of an allocation to application functions in the postage meter machine and with a user-authorized writing (entry) in the third part of the identifier string in the memory chip of the chip card. The first chip card 50 is at the highest hierarchy level and is the personalized master card. The second chip cards referenced 51 in the group are at the first hierarchy level, the further chip cards referenced 52 in the group are at the second hierarchy level, the following chip cards referenced 53 in the group are at the third hierarchy level, etc. The cards from these groups of chip cards for which the function application authorization is stored level-by-level limited in selectable fashion and tabularly are also referred to as successor cards. The first card MC is thus the master card (hierarchy 0) with which all initializations and modifications can be undertaken. For example, another five cards with the consecutive numbers 002 through 006 respectively for four of the cost centers exist in the first branch. The second card 51 is authorized for the access to the cost centers 1 through 4 as group card GC 1–4 (hierarchy 1). The further successor cards 52 are respectively authorized for only a single cost center as individual card EC 1, EC 3, EC 4 (hierarchy 2). The second card 51 can allow modifications in the successor cards 52, i.e. in the individual cards EC 1, EC 3, EC 4, in the scope of its own authorization. The modification of the cost center, namely KST number 1, 3 and 4, that is undertaken relates to a change in the allocation of application functions. Such a modification can be undertaken (top down) with the assistance of the group card (51) GC 1–4 but not (bottom up) for the first card 50 MC. The franked postage value can be booked onto one of the cost centers, namely the cost center numbers 1 through 4, with the group card (51) GC 1–4. An individual function card FC 2 initialized internally in the postage meter machine with the group card GC 1–4 then only allows its possessor to undertake an informational inquiry of the bookings under the cost center number 2 and only zero-value frankings with the postage meter machine.

Without generating a group card, it is also provided in a second branch to generate an individual card EC 5 and a function card FC 5, both of which are allocated to the fifth cost center. An individual function card FC 5, initialized internally in the postage meter machine with the individual card EC 5, only allows its possessor, for example, to undertake an informational inquiry of the bookings under the cost center number 5 and zero-value frankings with the postage meter machine. Without further hierarchy levels, only a successor card FC 9 allocated to a lowest hierarchy level can be internally initialized in the postage meter machine. The cards of the lowest hierarchy level are the most limited in function application scope.

Without omitting hierarchy levels, a number of successor cards allocated to each hierarchy level can likewise be internally initialized level-by-level in the postage meter machine in a third branch, i.e. a group card GC 6–8 as successor card 51 in the first hierarchy level, an individual card EC 8 as successor card 52 in the second hierarchy level and a function card FC 8 as successor card 53 in the third hierarchy level.

The protection of the cards against readout of the consecutive number is possible in a known way by PIN or other security algorithms. Given loss of the master card, a replacement is only possible from the postage meter machine manufacturer (and corresponding documentation of the authenticity). The inhibiting or enabling of all other cards is possible with the master card. A further security measure in the internal postage meter machine initialization of the system with the assistance of the master card is achieved because only physically present cards can be initialized; as a result, the secret, consecutive numbers of the cards are protected. An inhibiting of the corresponding memory area of the postage meter machine can ensue when a successor card is lost.

FIG. 2 shows a block circuit diagram for setting the function of the postage meter machine and for driving the printer 20 with a chip card write/read unit 70 and with a control system 1 of the postage meter machine. The control means 1 forms the actual meter and includes a first control device 90, a keyboard 88 and a display unit 89 as well as a first and a second application-specific circuits (ASIC) 87 and 97. The first control device 90 contains a first microprocessor 91 and known memories 92, 93, 94 as well as a clock/date circuit 95. Areas for storing accounting data that are allocated to the cost centers are provided in the non-volatile memory 94.

Together with a second microprocessor 85 and a non-volatile memory 84, the first ASIC 87 forms a postal security module PSM 86. The postal security module PSM 86 is enclosed in a physically secured housing and has a fast serial interface to the printer control 16. A hardware-based debiting in the first ASIC 87 ensues before every franking imprint. The debiting ensues independently of cost centers. The second microprocessor 85 contains an integrated read-only memory int.ROM (not shown) with the specific application program that is approved for the postage meter machine by the postal authority, or the respective mail carrier. The postal security module PSM 86 can be implemented as disclosed in greater detail in European Application 789 333.

Both ASICs 87 and 97 are connected via the parallel μC bus to at least the control device 90 and the display unit 89. The first microprocessor 91 preferably has terminals for the keyboard 88, a serial interface SI-1 for the connection of the chip card write/read unit 70 and a serial interface SI-2 for the optional connection of a modem. The credit stored in the non-volatile memory 84 of the postal security module PSM 86 can be increased with the modem.

The second ASIC 97 has a serial interface circuit 98 to a preceding device 13 in the mail stream, a serial interface circuit 96 to the printer device 20 and a serial interface circuit 99 to a device 18 following the printer device 20 in the mail stream.

A suitable peripheral device embodying such interfaces is described in German Application 197 11 997.2 (as yet unpublished), corresponding to pending U.S. application Ser. No. 09/041,469 filed Mar. 12, 1998 ("Arrangement for Communication Between Stations of a Mail Processing Machine," Kunde et al.) assigned to the same assignee as the present application.

The interface circuit 96 coupled with the interface circuit 14 located in the machine base produces at least one connection to the sensors 6, 7, 17 and to the actuators, for example to the drive motor 15 for the drum 11 and to a cleaning and sealing station RDS for the ink jet print head 4, as well as to the ink jet print head 4 of the machine base.

Further details of the interaction between the print head 4 and the cleaning and sealing station RDS are disclosed in German Application 197 26 642.8 (not yet published, corresponding to pending U.S. application Ser. No. 09/099,473, filed Jun. 18, 1998 ("Device for Positioning an Ink Jet Print Head and a Cleaning and Sealing Device," von Inten et al.) assigned to the same assignee as the present application.

One of the sensors 7, 17 arranged in the guide plate 2 is the sensor 17 and serves the purpose of preparing the print initiation during letter transport. The sensor 7 serves for recognizing the start of the letter for the purpose of print initiation during letter transport. The conveyor arrangement is composed of a conveyor belt 10 and two rollers 11, 11'. One of the rollers is the drive roller 11, connected to the a motor 15, another is the entrained tension roller 11'. The drive roller 11 is preferably a toothed roller; accordingly, the conveyor belt 10 is a toothed belt, assuring a positive force transmission. An encoder is coupled to one of the rollers 11, 11'. The drive roller 11 together with an incremental sensor 5 is preferably firmly seated on a shaft. The incremental sensor 5 is implemented, for example, as a slotted disk that interacts with a light barrier 6, forming the encoder.

The individual print elements of the print head 4 are connected within its housing to print head electronics, and the print head can be driven for a purely electronic printing. The print control ensues on the basis of the path control, with the selected stamp offset being taken into consideration, this being entered by keyboard 88 or, as needed, by a chip card and being non-volatilely stored in the memory NVM 94. A planned imprint thus derives from the stamp offset (without printing), the franking imprint image and, possibly, further print images for advertising slogan, dispatching information (selective imprints) and additional, editable messages.

Figure 3:
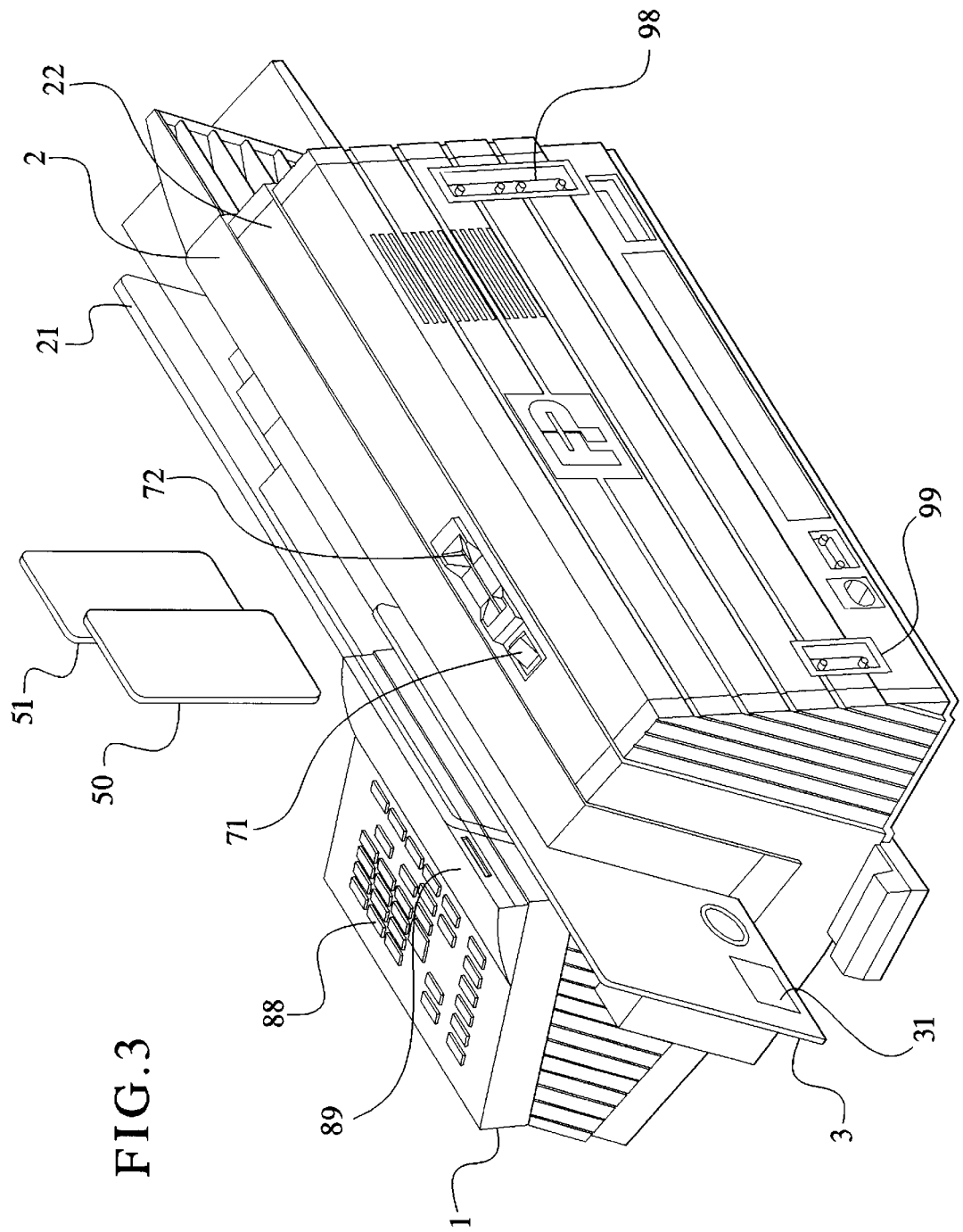
FIG. 3 is a perspective view of the inventive postage meter machine from behind.

FIG. 3 shows a perspective view of the postage meter machine from behind. The postage meter machine is equipped with a chip card write/read unit 70 that is arranged behind the guide plate 2 and is accessible from the upper housing edge 22. After the postage meter machine is turned on with the switch 71, a chip card 50 is plugged from top to bottom into the insertion slot 72 and can be programmed by the user for specific applications. Within the limits prescribed by the manufacturers, this ensues with the user interface 88, 89 of the control system 1 of the meter. The successor cards are configured by the user for predetermined function applications for the respective postage meter machine. The peripheral devices of the postage meter machine can be electrically connected to the interfaces 98 and 99 and thus can be driven by the meter according to the chip card input. A letter 3 supplied standing on edge that has its surface to be printed lying against the guide plate is then printed with a franking stamp 31 according to the input data. The letter delivery opening is laterally limited by a transparent plate 21 and the guide plate 2.

A predetermined cost center is set with the insertion of a first chip card 50 that was supplied together with the postage meter machine. For example, the cost center 1 is pre-set, the accounting ensuing with respect thereto in order to gain access to other cost centers when no other predetermined inputs are actuated by keyboard.

The postage meter machine contains a corresponding application program in its program memory 92, so that a first chip card 50 plugged into the chip card write/read unit 70 allows a setting of the postage meter machine for at least one function application on the highest hierarchy level.

In accordance with the invention the control system 1 has a control device 90 equipped with a microprocessor 91 with appertaining memories 92, 93, 94, 95 and a connected user interface 88, 89 that, dependent on a predetermined input, allows the user to undertake an internal postage meter machine initialization of at least one chip card from a number of further chip cards 51, 52, 53 subsequently inserted into the plug-in slot 72, with the microprocessor 91 of the postage meter machine being programmed to write data into a part of the identifier string of a chip card in order to at least supplement the chip card number. In conjunction with suitably inserted chip cards, the function input and the calling of the application function, for example the administration of cost center data to be entered are simplified. The further chip cards 51, 52, 53 are sequentially inserted into the plug-in slot 72 of the chip card write/read unit 70 and are internally initialized in the postage meter machine, with a table having a specific hierarchic structure being produced using the keyboard 88 and display 89 and with the assistance of the microprocessor 91 and the appertaining non-volatile memory within the postage meter machine. The pre-stored structure is correspondingly modified and stored in one of the appertaining non-volatile memories 94, 95 allocated to a respective chip card number, with the chip card number being stored in a segment provided therefor in an identifier string stored in the protected areas of the further chip cards 51, 52, 53. An inexpensive cost-beneficial chip card having only a little memory capacity is referred to below as type a. According to ISO 7816, a memory card having 256 bytes such as, for example, OMC240SP of the Orga company can be employed.

Another chip card having significant memory capacity is referred to below as type b. For example, an I²CBus memory card having 32 Kbytes according to ISO 7816, particularly AM2C256 of the AMMI company, can be employed. This contains a chip AT24C256 of the Atmel company.

Further chip cards are referred to below as type n. For example, a chip card with 8 Kbytes and having a microprocessor can be employed. The further chip cards of the types b through n relate, for example, to the following function applications:

reload possibility of the postage fee tables via chip card 49,
slogan reloading via chip cards (daily stamp),
chip cards with limited function application,
chip cards with PIN authorization of functions,
chip cards for setting peripheral device function,
chip cards for setting system configuration,
chip cards for the activation of programmed print formats.

Figure 4:
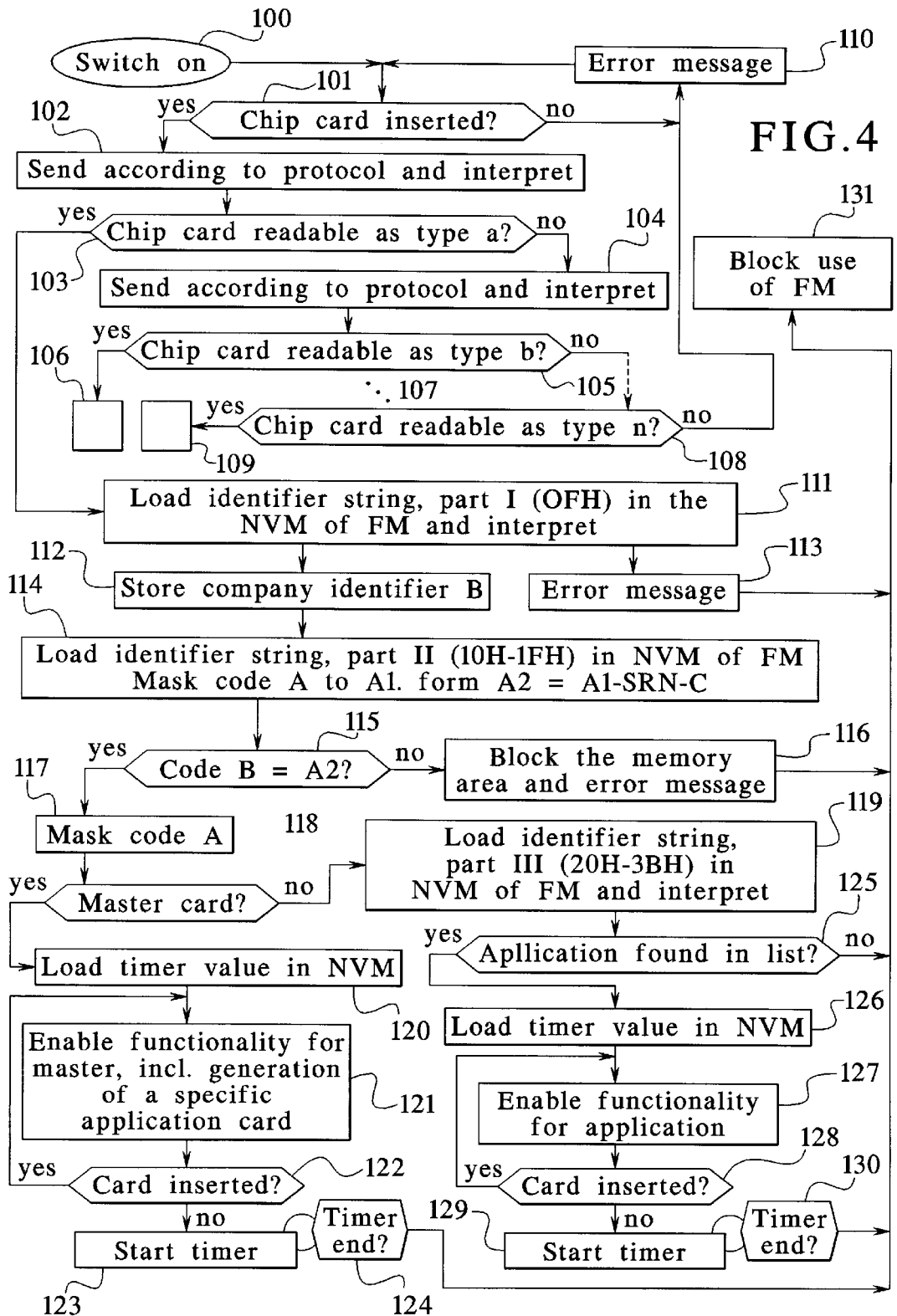
FIG. 4 is a flowchart for control by the microprocessor in the data entry procedure using a chip card in accordance with the invention.

FIG. 4 shows a flowchart for control by the microprocessor of the postage meter machine in the data input with a chip card.

After a power supply (not shown) of the postage meter machine is turned on with the switch 71, which is registered by the microprocessor 91 of the postage meter machine in the step 100, a microprocessor 75 connected to a contacting arrangement 74 of the chip card write/read unit 70 signals the microprocessor 91 of the postage meter machine when a chip card is inserted into the plug-in slot 72, which is registered by the microprocessor 91 of the postage meter machine in the step 101. A communication according to a predetermined protocol between the chip card write/read unit 70 and the chip card and an evaluation in step 102 then ensues as to determine whether the chip card is readable as type a. When this is the case, a branch is made from the inquiry step 103 to a step 111 in order to load a part I of the identifier string into the non-volatile memory 94 of the postage meter machine, with an evaluation of the company identification number (company ID) being undertaken by the microprocessor 91 of the postage meter machine. If, however, the chip card is not readable as type a, a branch is made from the inquiry step 103 to a step 104 in order to undertake a communication according to a second predetermined protocol and an evaluation in step 104 as to whether the chip card is readable as type b. When the chip card is readable as type b, a branch is made from the inquiry step 105 to a step 106 for further data processing with the microprocessor 91 of the postage meter machine. In a comparable way as warranted, further protocols are executed (steps 107, not shown in detail) to determine in the inquiry step 108 whether the chip card is readable as type n, in order to then branch to a corresponding step 109 for further data processing by the microprocessor 91 of the postage meter machine. Otherwise, when the type of the chip card is not recognized, a branch back to the step 101 ensues after an error message in the step 110.

Differing from U.S. Pat. No. 5,490,077, wherein the sequence is fixed and a chip card A for loading postage fee tables must be plugged in before a chip card B that, for example, sets a cost center, the inventive sequence for the sequential plugging of a series of chips cards internally initialized in the postage meter machine is arbitrary. Additionally, the type of chip card can be distinguished according to the inventive flowchart according to FIG. 4. Advantageously, a suitable chip card type corresponding to the type of application is selected.

An expensive type of chip card only has to be employed in the special instances where there is no alternative.

There is no master card in U.S. Pat. No. 5,490,077, i.e. the chip cards are all technologically and functionally identical. An allocation of the five-place cost center number KST-No. to the function scope of the postage meter machine is only possible for the manufacturer. Differing therefrom, it is now inventively also possible for the user to store a free allocation of three places of the five-place KST number for at least one of the application functions internally in the postage meter machine.

A time window for the insertion of every chip card is an invariable, fixed time period in U.S. Pat. No. 5,490,077. Inventively, however, no time limit is now prescribed for the first insertion of the chip card. Advantageously, a timer value is loaded into an area of the non-volatile memories 94 or 95 of the postage meter machine in a type of application corresponding to the identifier string of the chip cards, this timer value being formed by a counter that defines a time window for a succeeding action that, for example, is implemented with a successor chip card.

When a branch is made from the inquiry step 103 to a step 111 in order to load a part I of the identifier string of the non-volatile memory 94 of the postage meter machine, with the microprocessor 91 of the postage meter machine undertaking an evaluation of the company identification number (company ID), a chip card of type a is utilized with which information for the further operation of the postage meter machine can be derived from a stored company identifier B. As warranted, the microprocessor 91 additionally checks the company identifier B in a known way for the presence of a valid company ID. Otherwise, an error message is output in the optional step 113. In the step 112, the company identifier B is stored in one of the non-volatile memory areas of the postage meter machine in order to then branch to a step 114.

In the step 114, a part 11 of the identifier string is loaded into the non-volatile memory 94 of the postage meter machine, with the microprocessor 91 of the postage meter machine undertaking a masking of the starting identifier A for the derivation of a first identifier A1 with which a computational operation is subsequently implemented for forming a second identifier A2, in order to subsequently check whether the first part I stemming from the identifier string and the identifier A2 have a predetermined relationship to one another. For forming a second identifier A2, a computational operation having the form $$A2=A1-SRN-C \qquad (1)$$

ensues with the serial number SRN of the postage meter machine and with a secret constant C.

Using the company identifier B, the microprocessor 91 of the postage meter machine is to subsequently check:

$$\text{Identifier } B=A2 \qquad (2)$$

Evaluating Equation (2), an inhibiting of the memory area in the postage meter machine ensues for predetermined applications in the step 116 when the predetermined relationship is lacking or—otherwise—, for example when the company identifier (company ID) is the same as the second identifier A2 that is formed, a branch is made to a step 117. A further masking of the identifier can now be undertaken in order to identify the master card.

A check to see whether a master card is present is carried out in the inquiry step 118. When this is the case, a branch is made to a step 120 in order to load a timer value into the non-volatile memory 94 of the postage meter machine, whereby the microprocessor 91 of the postage meter machine—in the step 121—enables the functionality that is provided in the program memory 92 of the postage meter machine for the master card. This functionality includes a generation of a specific functions application card with the postage meter machine, which is explained in greater detail below with reference to FIG. 5. A check is thereby carried out in the step 122 to determine whether the card is still plugged in. When this is the case, the functionality is enabled further. Otherwise, a timer is started in the step 123. For example, the timer is a backward (countdown) timer realized with memory cells in the volatile memory 93 or in one of the non-volatile memories 94, 95 of the postage meter machine, and the oscillator in the clock/date circuit 95 supplies a corresponding clock signal. At the end of the timer, for example when the count value zero is reached, an interrupt is triggered for the microprocessor 91 of the postage meter machine. In the following step 131, further use of the postage meter machine for at least the one functionality of franking is then inhibited.

When a determination is made in the inquiry step 118 that no master card is present, a branch is made to a step 119 in order to load the part III of the identifier string into the non-volatile memory 94 or 95 of the postage meter machine and in order to undertake an evaluation of the chip card number stemming therefrom. A number of different application functionalities is listed in the memory cells of a memory area of the non-volatile memory 94 or 95 of the postage meter machine, with a corresponding chip card number being allocated to every application functionality. When no application is stored in the list allocated to a specific chip card number, a branch is made from the inquiry step 125 to the following step 131 in order to inhibit the further use of the postage meter machine for at least the one functionality of franking. Otherwise, a timer is started in the step 123, and the listed functionality is enabled in the step 127 according to the chip card number. A check is carried out in the step 128 to determine whether the card is still plugged. When this is the case, a branch back ensues and the functionality is enabled further. At the end of the timer, an interrupt is triggered for the microprocessor 91 of the postage meter machine and a branch is made to the following step 131.

The identifier string has a key-like function. The identifier string is non-volatilely stored in the chip card distributed among a number of security areas, so that different security demands must be met for the modification of the part of the identifier string stored in the respective security area. Since the manufacturer has written the first and second parts of the identifier string, a user of the postage meter machine can write the third part of the identifier string with a chip card number. The microprocessor 91 is programmed to modify a chip card number stored in the chip card and to store an allocation of the chip card number to listed application functions in the non-volatile memory of the postage meter machine.

The microprocessor 91 of the control device 90 is programmed—in combination with chip cards suitably initialized for the respective application purpose—to simplify the function input and an application function, for example the administration of cost center data to be registered. The function input includes the top down initialization of further chip cards.

Inventively, the identifier string is checked in the postage meter machine downwardly proceeding from the highest security level and opens (allows access to) all memory areas in the non-volatile memory of the postage meter machine specifically required in an application. A recognized gap (absence of an entry) in the identifier string generates an error message and results in a blocking of the appertaining memory area in the non-volatile memory of the postage meter machine and/or the chip card.

The chip card write/read unit 70 is composed of a mechanical carrier for the microprocessor card and a contacting arrangement 74. The latter allows a reliable mechanical holding of the chip card in the read position and unambiguous signaling of when the read position of the chip card in the contacting arrangement 74 is reached, for example a tactile signal by a pressure point according to the push/push principle, an eject key or a display beeper message of the postage meter machine. A reliable electrical contacting of chip cards with contacts according to ISO 7816 for at least 100,000 contacting cycles, as well as easy utilization when plugging and pulling the chip card are thus achieved. The microprocessor card with the microprocessor 75 has a programmed-in read capability for all types of memory cards, as well as for chip cards with and without PIN coding. An encryption or deciphering for security algorithms (for example, RSA, DES) is not required. The interface to the postage meter machine is a serial interface according to RS232 standard. The data transmission rate amounts to a minimum of 1.2 Baud. A self-test function with ready message can be manually implemented or can be automatically implemented after turning on the power supply with switch 71. The master card 50 inserted into the plug-in slot 72 grants at least an access authorization to the overall cost center, i.e. all issued master chip cards access only this cost center. After this, there is the possibility of selecting another cost center by keyboard. Among other things, master chip cards are provided for the inventive definition of the chip card/cost center relationship and for enabling/inhibiting cards. For expanding the function scope, an access possibility to defined cost centers via the successor cards can be created with the postage meter machine, whereby a storage of the allocation being possible according to an arbitrary hierarchy.

The chip cards of type a are suitable for all access/cost center handling function applications. Each postage meter machine with chip card reader is delivered with at least one master card. Second and further supplied cards are referred to as successor cards. When delivered, each of these cards has a chip card number that is not yet valid, or that is incomplete. After their initialization internally in the postage meter machine, however, they have a running chip card number that is an unambiguous identifier for each chip card. The chip cards are not yet allocated to specific postage meter machines only in their delivered condition. The new postage meter machine to be placed in operation should preferably automatically validate the first plugged chip card as the master card and deposit a corresponding chip card number in its memories. The allocation of the functionality of every existing or subsequently supplied card ensues internally in the postage meter machine via a table. The functionality of the master card is defined as follows:

a) The cost center KST 1 is selected as a pre-setting; this pre-set value can be modified.
b) It is manually possible to establish, delete and select cost centers KST.
c) It is possible to allocate successor cards to specific cost centers KST, to modify or delete allocations.
d) All available KST linkage conditions are definable or, respectively, the table is to be filled with input data according to a linkage.
e) Access to the full functionality of the postage meter machine.

The functionality of the successor card is defined as follows:
a) Automatic selection of a defined cost center KST or KST group with the linkage conditions thereof (advertizing slogan No., potentially with value limitation per time unit, etc.).
b) Set, modify or delete cost center/advertizing slogan allocations. Free selection of all slogans present in the postage meter machine.
c) "Duplicate successor cards" function.

The security with respect to protection against card copying is assured by manufacturer-specific and user-specific information in a write-protected area of the card.

At the manufacturer side, the chip cards are provided with a manufacturer-specific identifier B in the write-protected part 11 of the identifier string. Additionally, the identifier A is stored write-protected on the part of the postage meter machine upon initial authorization, this identifier A being composed of the serial number of the postage meter machine, for example 505010, and an appended, for example three-place consecutive number, for example 001. The personalization already arises from the serial number of the postage meter machine and the appended, three-place number, for example 505010 001. This personalization can ensue at the manufacturer for the master card. Although a distinction is made between master card and successor cards, the difference is only that the master card is the first card authorized by the postage meter machine and is automatically given the number 001. Otherwise, the structure of the card content is identical.

The postage meter machine JetMail® is able to automatically authorize chip cards for use at the machine. This occurs proceeding from a cost center menu sub-point provided therefor by allocating—after insertion of the master card and selection of the authorization function—an arbitrary successor card to an existing or newly defined cost center or group. To this end, the corresponding successor card is plugged and is written with an identifier A by the postage meter machine. When the chip card is used, both identifiers (A and B) are loaded from the chip card into the postage meter machine and are compared to one another therein after a computational operation. Given, for example, equality, the interpretation of the blanked-out, last three places of the identifier A ensues via a table with respect, among other things, to which const center number this card is allocated. The first entry in the table ensues for the master card. The postage meter machine is blocked without an inserted master card exhibiting said authorization function. For example, the following table is present in the postage meter machine for the first branch according to FIG. 1*b*:

| Card No. | KST No. | Timer value | Adventizing slogan | Function Limit | Value limit | Actual remaining value |
|---|---|---|---|---|---|---|
| 1234567801 | 1–50 | 20 sec | no | all/5000 | R3.x = 5000.— | R1.x = 99.— |
| 1234567802 | 1–4 | 10 sec | 1 | F1/2000 | R3.y = 2000.— | R1.y = 255.— |
| 1234567803 | 1 | 2 sec | 1 | F3/2000 | R3.1 = 1000.— | R1.1 = 99.— |
| 1234567804 | 3 | 2 sec | no | F4/2000 | R3.3 = 1000.— | R1.3 = 10.— |
| 1234567805 | 4 | 2 sec | 5 | F5/3500 | R3.4 = 3000.— | R1.4 = 2005.— |
| 1234567806 | 2 | 1 sec | no | F6/6000 | R3.2 = 0.— | R1.2 = 0.— |

The customer has the possibility of labeling the type a chip card with the current cost center number. Modifications of allocations between chip cards and cost center numbers are only possible via the master card. Certain menu points in the cost center menu are thus only enabled with inserted master card. Further, certain linkage conditions for the cost centers are analogously variable, for example with respect to advertizing slogan No., value limit per time unit. The postage meter machine reacts to inequality or unknown, invalid cards with a corresponding error message. As a result of the "duplicate successor cards" function, the postage meter machine JetMail® continues to be able—with the assistance of the master card—to independently authorize successor cards for use at it. To that end, the corresponding successor card is inserted and written with the identifier A by the postage meter machine. A value limit for the usage of franking values per calendar month whose validity is limited in time (monthly) but renewable can be defined for each cost center KST with the assistance of the master card. The entire credit present in the postage meter machine JetMail® is maximally available for every cost center KST. At the beginning of a new calendar month, the predetermined value limit is transferred; there are no carry-overs. Changes of allocations between chip cards and cost centers as well as the potentially correlating value limitations are possible only with the assistance of the master card. The user interface of the postage meter machine is completely present at all times but, given selection of the points reserved for the master card when the master card is not inserted, this is required as authorization. The displayable table for the administration of the chip card functionality can, for example, contain the fields: chip card No./KST No./timer value/function with limit/advertizing slogan allocation/value limit/current remaining value. For what are referred to as group cards, it is fundamentally possible that groups of x cost centers are allocated to a card number.

The control device 90 of the postage meter machine connected to the chip card write/read unit 70 has a non-volatile memory 95 with inventive memory areas A, B and C for an allocation of listed application functions to a chip card. (As described below, the clock/data module 95 also performs the function of a further non-volatile memory.) This display of the allocation can ensue according to the aforementioned table or in a similar form. In accordance with the invention, the control device 90, dependent on a predetermined input, allows a setting of the postage meter machine for at least one function application program from a number of further function application programs by the insertion of at least one chip card from a set of chip cards 50, 51, 52, 53, that is inserted into the plug-in slot 72 of the chip card write/read unit 70. Each chip card 50, 51, 52, 53 for a predetermined input merely contains a chip card number. The microprocessor 91 of the control device 90 is programmed a) to load the chip card number stored in the respective chip card 50, 51, 52, 53;

b) to load the limit data belonging to a function stored in the first chip card 50, whereby the limit data belong to a function that can be called by a further chip card;

c) to store the allocation of limit data belonging to a function in the aforementioned memory areas A, B allocated to further chip card numbers, whereby the allocation to the chip card number can be stored in said memory areas A, B arbitrarily selectable by the authorized user for the following call by further chip cards with its number;

d) to call an allocation of the listed application functions with limit data to the respective chip card number in one of the memory areas A, B of the non-volatile memory 94, 95 of the postage meter machine and to implement the corresponding application programs stored in the program memory.

The microprocessor 91 of the control device 90 also is programmed to load the limit data stored in the first chip card 50 into a memory area C of the non-volatile memory 94, 95 of the postage meter machine as a parameter.

Figure 5A:
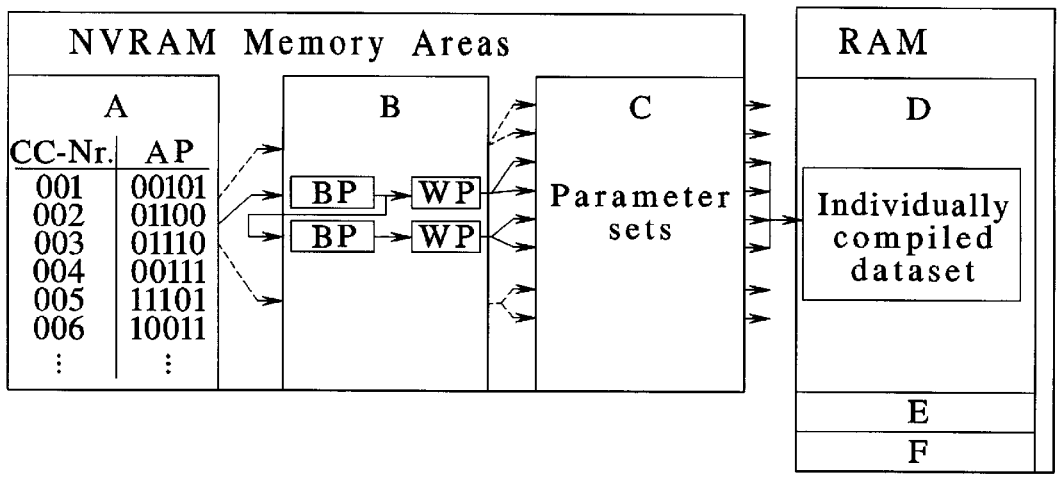
FIG. 5a illustrates the division (distribution) of the structure among memory areas of the non-volatile memory of the postage meter machine.

FIG. 5a shows a division of the structure onto memory areas A, B and C, whereby a list of valid card numbers is non-volatilely stored in the first memory area A, linkage conditions are non-volatilely stored in the second memory area B and appertaining parameter sets are non-volatile stored in the third memory area C. This structure can be separately modified in each of the aforementioned memory areas A and B. For example, a further card number is newly added to the listing in the list of valid card numbers CC-No. Each card number has an address pointer AP allocated to it that points to an address in the second memory area B under which the card number-dependent linkage conditions are stored together with appertaining condition pointers BP and value pointers WP. The value Pointers WP point to an address for the appertaining parameter set in the third memory area C. A linkage is freely selectable via the condition pointers BP that point to an address for a further condition with the appertaining value pointer. The value pointer WP then points to an address with the appertaining parameter set in the third memory area C.

The divided (distributed), modifiable structure can be restored via the pointers, whereby an intermediate storage of the loaded pointers ensues in memory areas E, F of the main memory RAM 93, and a corresponding data entry into a memory area D of the main memory RAM 92, are undertaken for storing a dataset. For this purpose the microprocessor 91 of the postage meter machine executes a corresponding function or a stored sequence of functions according to the application program and the entered parameters. One of the functions can be implemented for the initialization of successor cards in order to be able to modify these, or in order to at least partially display the structure in a table.

It is assumed according to FIG. 4 that a part III of the identifier string is interpreted and that a determination is then made in step 125 that the function application is listed, i.e. the card number is found in the memory area A. A timer value is now loaded into a further memory area of a non-volatile memory, preferably a memory area of the clock/date module 95. The step 127 is then reached.

Figure 5B:
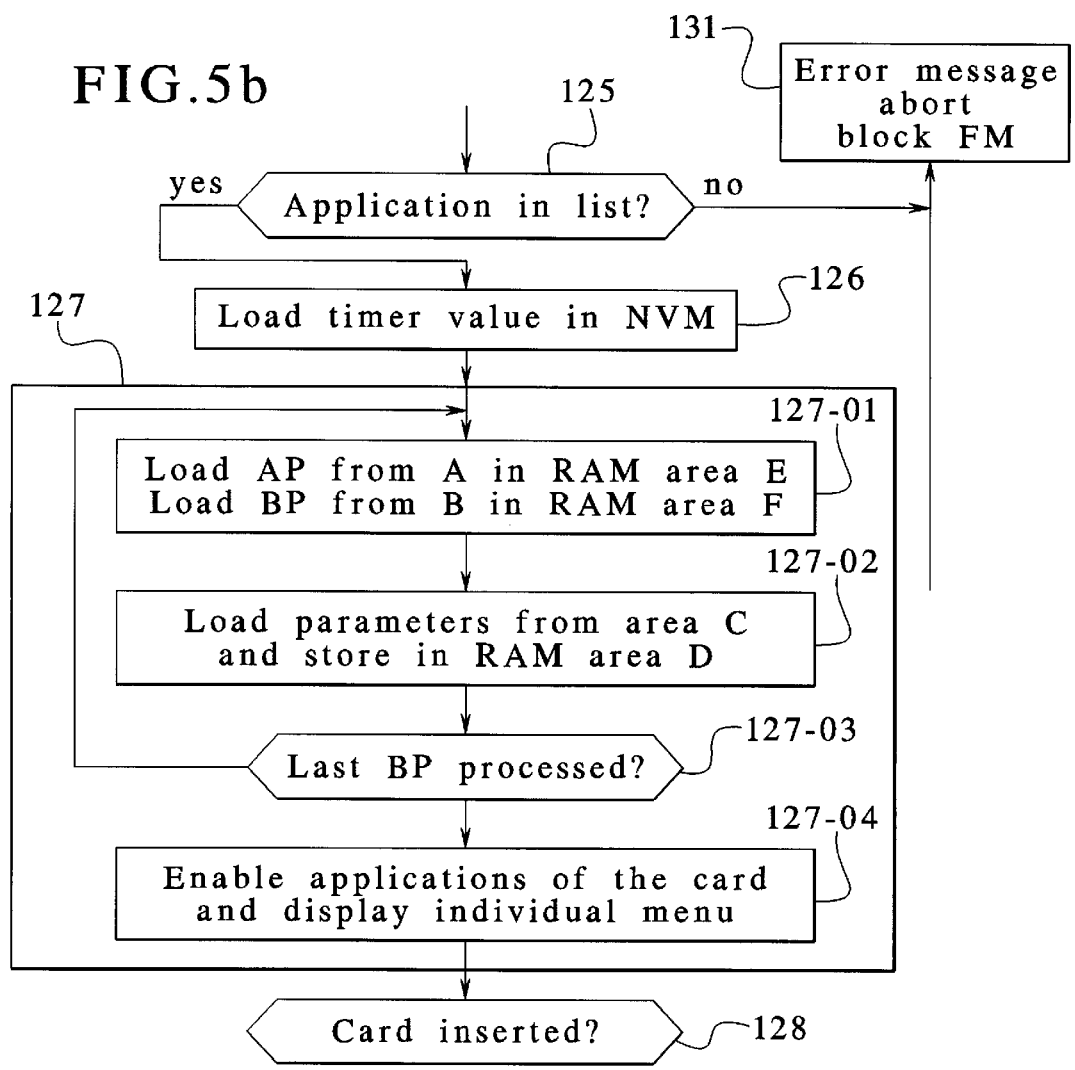
FIG. 5b is a flowchart for control by the microprocessor when calling at least one of the functions according to the stored structure by entering a chip card number.

FIG. 5b shows a detail of the flowchart of FIG. 4 in order to illustrate the control by the microprocessor 91 when calling at least one of the functions according to the stored structure by inputting a chip card number. Before the functionality is enabled for a successor card, that address pointer AP that is allocated in memory area A to the chip card number is loaded into a memory area E of the main memory RAM 93 in a sub-step 127-01. In the sub-step 127-01, moreover, condition points BP are loaded step-by-step into a memory area F of the main memory RAM 93 for every pass through a loop S. The memory areas E and F of the main memory RAM 93 serve for the intermediate storage of the data of the pointers AP and BP for the following data processing. After the loading and intermediate storage of the data of the pointers AP and BP, a value pointer WP stored in the second memory area B is found, this being allocated to the condition pointer BP. At the same time, a following condition pointer BP that the microprocessor 91 is accessed so as to find further, appertaining value pointers WP is taken from the data of the condition pointer BP. The further data processing in the sub-step 127-02 is preferably nested, i.e. time-optimally organized. Thus, the technique know as "pipelining" can be implemented when the value pointers WP point to the parameter sets in the third memory area C and corresponding parameter sets are loaded from the third memory area C for storage in the RAM area D of the main memory RAM 93. A check is carried out in the following sub-step 127-03 to determine whether a last condition pointer BP had been processed in the aforementioned processing of the routine. When this is not the case, a branch is made back to the sub-step 127-01 in order to again sequentially process the loop S until the processing of a last condition pointer BP has been determined in the sub-step 127-03. In the following sub-step 127-04, the applications of the inserted card are enabled according to the dataset in the memory area D individually compiled during the processing of said loop S. The microprocessor 91 thereby has recourse to function applications stored in the program memory 92 and to the parameters that are present in said intermediately stored dataset. At the same time, an individual menu corresponding to the individual dataset can be displayed in the display unit 89.

A function application stored in the program memory 92 provides a keyboard input so that the microprocessor 91 can complete the processing of the application program. The microprocessor 91 is programmed to access three memory areas A, B, C of the non-volatile memory 94,95 of the control device 90 in order to call an allocation of the listed application functions to the respective chip card number in the non-volatile memory 94, 95 of the postage meter machine and to implement the corresponding application programs. The allocation represents a predetermined structure, whereby the modifiable structure divided onto the three memory areas A, B, C of the non-volatile memory 94, 95 can be restored with pointers. The allocation of the listed application functions to the respective chip card number in one of the memory areas A, B of the non-volatile memory 94, 95 of the postage meter machine that is called by the microprocessor 91 in order to implement the corresponding application programs stored in the program memory 92 can be arbitrarily modified with an inserted master card, because the allocation can be stored arbitrarily selectable in the memory areas A, B by the authorized user according to at least one corresponding input, for example by keyboard 88.

The structure stored non-volatilely in the non-volatile memory 94 of the postage meter machine is a hierarchic structure established by the sequence of the listing of the chip card numbers and by the allocation of listed application functions.

The microprocessor 91 of the control device 90 is programmed to load the chip card number of the inserted chip card, that is stored in a segment provided therefor in an identifier string stored in the protected memory areas of the respective chip cards 50, 51, 52, 53, and to correspondingly implement a function input after the insertion of the chip card. A function input is thereby provided in order to call at least one application function. For example, a function input is provided in order to simplify the administration of cost center data to be managed by accessing the appertaining function application program.

The programmability of the applications that are allocated to a chip card number explained with reference to the example of step 127 applies to first chip cards (master cards) in step 121 as well as to second and further successor cards. For master cards 50, a branch when processing a corresponding step 121-04 can be made to a screen image for a menu prompt, "generate an application card" (step 121-1, not shown).

A group card GC is a second card that is authorized higher than a further chip card EC or successor card FC (FIG. 1b). These latter cards EC and FC form group members on different hierarchy levels 52 and 53. The authorization protection within a group application, i.e. applications in a hierarchy level 52 or 53, also can be adapted to very different demands made of the individual security of the group members. This is achieved by maintaining a limit account in the postage meter machine for every chip card EC or FC unambiguously identifiable by the microprocessor on the basis of the hierarchically structured identifier string. The group card GC ranking hierarchically higher previously loads the limit account into protected memory areas of the non-volatile memory 94 upon initialization of the hierarchically lower ranking chip card EC or FC.

For example, the limit account is a time account that contains the following characteristic quantities:

repeated use within a time range Z1, maximally allowed usage spacing amounts to time span Z2, maximum use duration/session amounts to time span Z3, maximum lifetime amounts to time span Z4, the application extension time amounts to time span Z5.

As a result of such parameters (time account data), authorizations and limitations up to an expiration date at which the application is blocked can be granted to every chip card type. Only the chip card that granted authorizations and limitations can block or renew the grant. Inventively, the higher-ranking chip card (group card) granting an authorization/limitation can individually renew or extend the authorization for lower ranking chip cards EC or FC.

The microprocessor 91 of the postage meter machine sends the PIN data to the first chip card 50 via the microprocessor 75 of the chip card write/read unit 70 in order to initiate the loading of the limit data belonging to a function. At least the first chip card 50 is an intelligent memory card realized with a read-only memory ROM for a general memory area, with a non-volatile write/read memory EEPROM that contains an unprotected memory area CC1 and a protected memory area CC2. The first chip card 50 also has a specific security and protection logic that implements a PIN check before security-relevant data in the protected memory area CC2 are accessed. Security-relevant data that represent limit data in terms of time, piece count or value or contain functions that effect a limitation of an operation are stored in the protected memory area CC2 of the first chip card 50 together with the one part of the chip card number. The limit data stored in the first chip card 50 are stored affiliated with a function.

Although modifications and changes may be suggested by those skilled in the art, it is the intention of the inventor to embody within the patent warranted hereon all changes and modifications as reasonably and properly come within the scope of his contribution to the art.

I claim as my invention:

1. A postage meter machine comprising:

a printer for printing an imprint on a print-receiving medium;

a control system connected to said printer for controlling a printing procedure resulting in printing of said imprint by said printer, said control system including a microprocessor, a non-volatile memory, having a plurality of non-volatile memory areas, connected to said microprocessor, and a user interface connected to said microprocessor;

a chip card write/read unit connected to said microprocessor;

plurality of chip cards, including a first chip card and further chip cards, individually insertable into said chip card write/read unit, each of said chip cards having a chip card number;

said user interface allowing a user to store a plurality of functions, associated with said printing procedure, in said non-volatile memory areas with said functions being allocated in an arbitrarily selectable manner by said user, via said user interface, to the respective chip card numbers of said chip cards;

said first chip card having limit data stored therein which limit the respective functions allocated to said chip card numbers;

said microprocessor, upon insertion of said first chip card in said chip card write/read unit, loading said limit data into a storage medium and storing said limit data therein;

a program memory, accessible by said microprocessor, containing a plurality of programs respectively allocated to said plurality of functions; and said microprocessor, upon insertion, after insertion and removal of said first chip card, of one of said further chip cards in said chip card write/read unit as an inserted chip card, loading only the number of said inserted chip card and calling the application function allocated thereto in said non-volatile memory areas, as a called function, and also calling the limit data allocated to said called function, and executing, limited by said limit data, the program allocated to said called function in said program memory.

2. A postage meter machine as claimed in claim 1 wherein said limit data comprise parameter data, and wherein said storage medium in which said limit data are stored comprises one of said memory areas of said non-volatile memory, and wherein said memory areas of said non-volatile memory in which said functions are stored comprise memory areas respectively dedicated to different purposes within a predetermined structure, said microprocessor comprising an electronic pointer for accessing said areas of said non-volatile memory in which said functions are stored in a sequence set by said predetermined structure, wherein said postage meter machine further comprises a main random access memory, and wherein said microprocessor, for executing the program allocated to the called function, operates said electronic pointer to access the parameter data stored in said non-volatile memory for temporarily transferring said parameter data into said main random access memory.

3. A postage meter machine as claimed in claim 2 wherein said predetermined structure comprises a hierarchically organized structure established by a sequence of said chip card numbers and positions of the respective functions allocated to said chip card numbers in said hierarchically organized structure.

4. A postage meter machine as claimed in claim 3 wherein said sequence of said chip card numbers establishes a ranking of said chip cards from a highest ranking chip card, comprising said first chip card, to a lowest ranking chip card, comprising one of said further chip cards, and wherein said microprocessor receives authorization for executing the function allocated to a lower ranking chip card in said sequence from a higher ranking chip card in said sequence.

5. A postage meter machine as claimed in claim 1 wherein PIN data, uniquely allocated to said postage meter machine, are accessible by said microprocessor, and wherein said first chip card contains a read only memory having a general memory area and a non-volatile write/read memory containing an unprotected memory area and a protected memory area, said limit data being stored in said protected memory area, and said first chip card further containing security and protection logic, said microprocessor, upon insertion of said first chip card in said chip card write/read unit, transferring said PIN data to said first chip card and said security and protection logic in said first chip card conducting a check of said PIN data and allowing access by said microprocessor to said limit data stored in said protected memory area only if said check of said PIN data identifies said microprocessor as being authorized to received said limit data.

6. A method for operating a postage meter machine comprising the steps of:

printing an imprint on a print-receiving medium;

controlling a printing procedure resulting in printing of said imprint with a control system including a microprocessor, a non-volatile memory, having a plurality of non-volatile memory areas, connected to said microprocessor, and a user interface connected to said microprocessor;

connecting a chip card write/read unit to said microprocessor;

providing a plurality of chip cards, including a first chip card and further chip cards, individually insertable into said chip card write/read unit, each of said chip cards having a chip card number;

via said user interface, storing a plurality of functions, associated with said printing procedure, in said non-volatile memory areas with said functions being allocated in an arbitrarily selectable manner by a user, via said user interface, to the respective chip card numbers of said chip cards;

storing limit data in said first chip card which limit the respective functions allocated to said chip card numbers;

said microprocessor, upon insertion of said first chip card in said chip card write/read unit, loading said limit data into a storage medium and storing said limit data therein;

providing a program memory, accessible by said microprocessor, containing a plurality of programs respectively allocated to said plurality of functions; and after insertion and removal of said first chip card, inserting of one of said further chip cards in said chip card write/read unit as an inserted chip card, and said microprocessor thereupon loading only the number of said inserted chip card and calling the application function allocated thereto in said non-volatile memory areas, as a called function, and also calling the limit data allocated to said called function, and executing, limited by said limit data, the program allocated to said called function in said program memory.

7. A method as claimed in claim 6 wherein said limit data comprise parameter data, and wherein the step of storing said limit data said storage medium comprises storing said limit data in one of said memory areas of said non-volatile memory, and wherein said method comprises the additional steps of organizing said memory areas of said non-volatile memory in which said functions are stored to dedicate respective memory areas to different purposes within a predetermined structure, providing an electronic pointer in said microprocessor for accessing said areas of said non-volatile memory in which said functions are stored in a sequence set by said predetermined structure, providing a main random access memory, and said microprocessor, for executing the program allocated to the called function, operating said electronic pointer to access the parameter data stored in said non-volatile memory for temporarily transferring said parameter data into said main random access memory.

8. A method as claimed in claim 7 comprises establishing a hierarchically organized structure, as said predetermined structure, by a sequence of said chip card numbers and positions of the respective functions allocated to said chip card numbers in said hierarchically organized structure.

9. A method as claimed in claim 8 comprising establishing a ranking of said chip cards in said sequence from a highest ranking chip card, comprising said first chip card, to a lowest ranking chip card, comprising one of said further chip cards, and said method comprising the additional step of giving said microprocessor authorization for executing the function allocated to a lower ranking chip card in said sequence from a higher ranking chip card in said sequence.

10. A method as claimed in claim 6 comprising uniquely allocating PIN data to said postage meter machine and making said PIN data accessible by said microprocessor, providing said first chip card with a read only memory having a general memory area and a non-volatile write/read memory containing an unprotected memory area and a protected memory area, storing said limit data being stored in said protected memory area, and providing said first chip card with security and protection logic, said microprocessor, upon insertion of said first chip card in said chip card write/read unit, transferring said PIN data to said first chip card and said security and protection logic in said first chip card conducting a check of said PIN data and allowing access by said microprocessor to said limit data stored in said protected memory area only if said check of said PIN data identifies said microprocessor as being authorized to received said limit data.

* * * * *